Oct. 7, 1958 G. E. BATCHELDER 2,854,859
LATCH MECHANISM
Original Filed Feb. 17, 1954 4 Sheets-Sheet 1
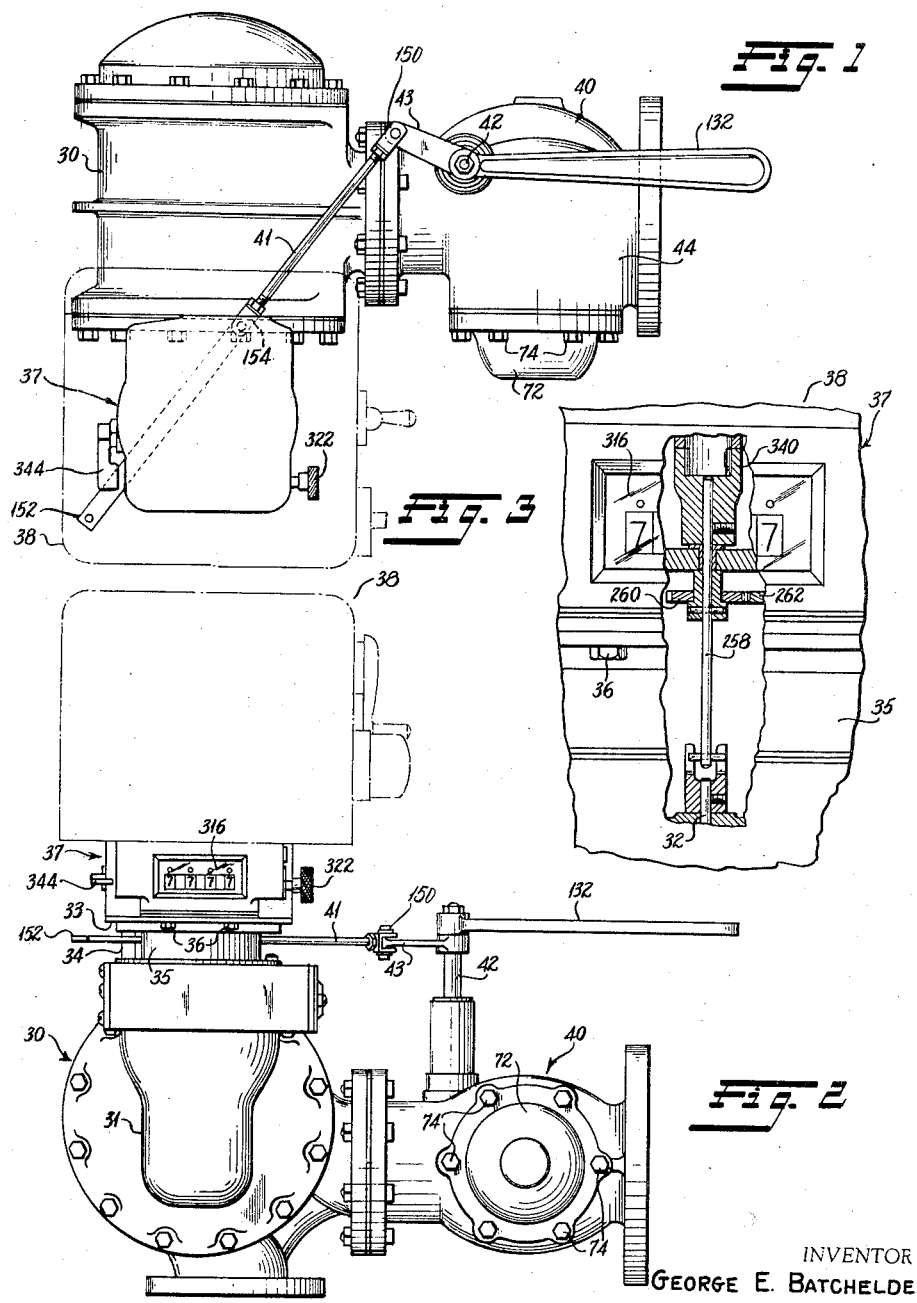
INVENTOR
GEORGE E. BATCHELDER
BY
ATTORNEYS

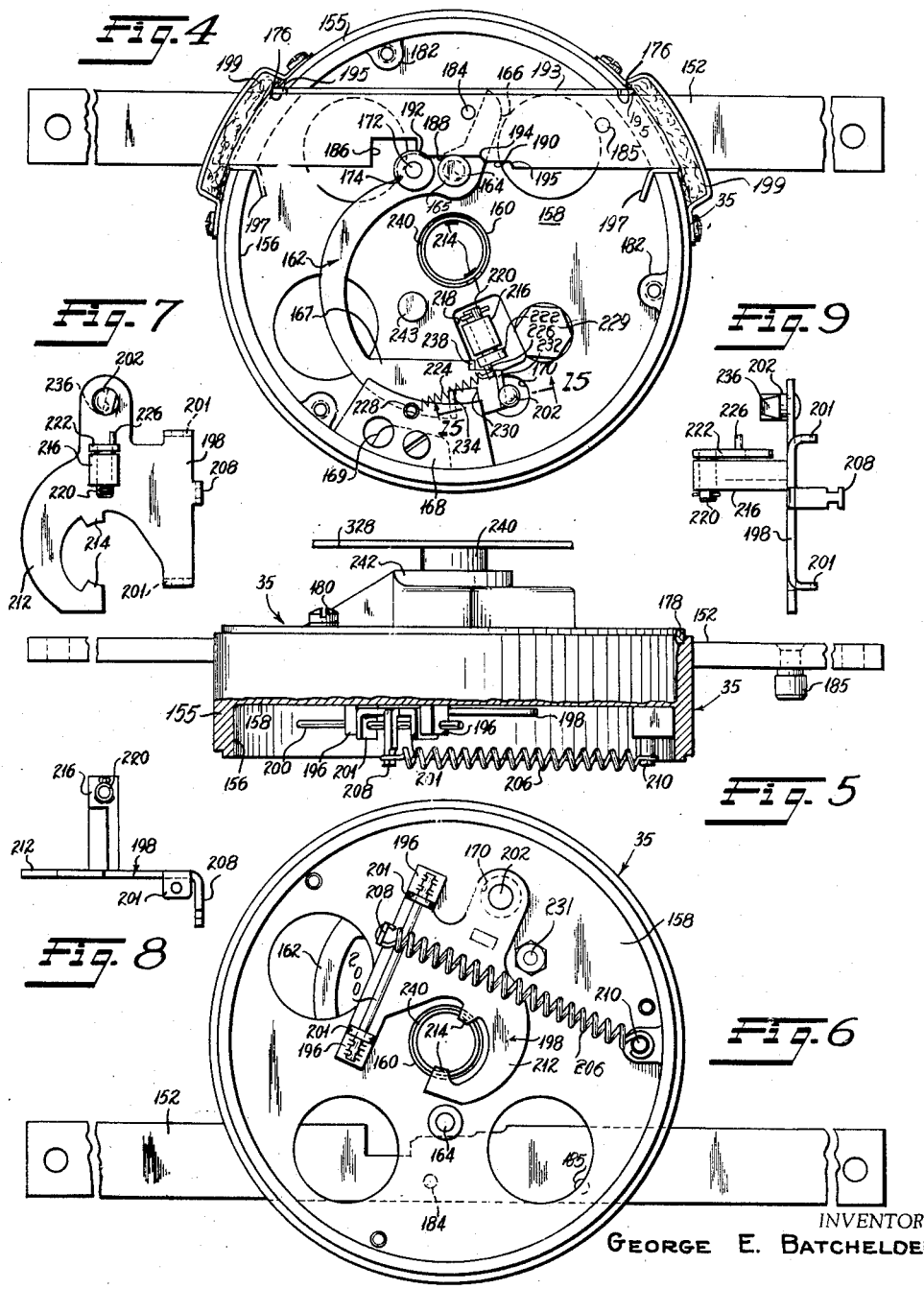

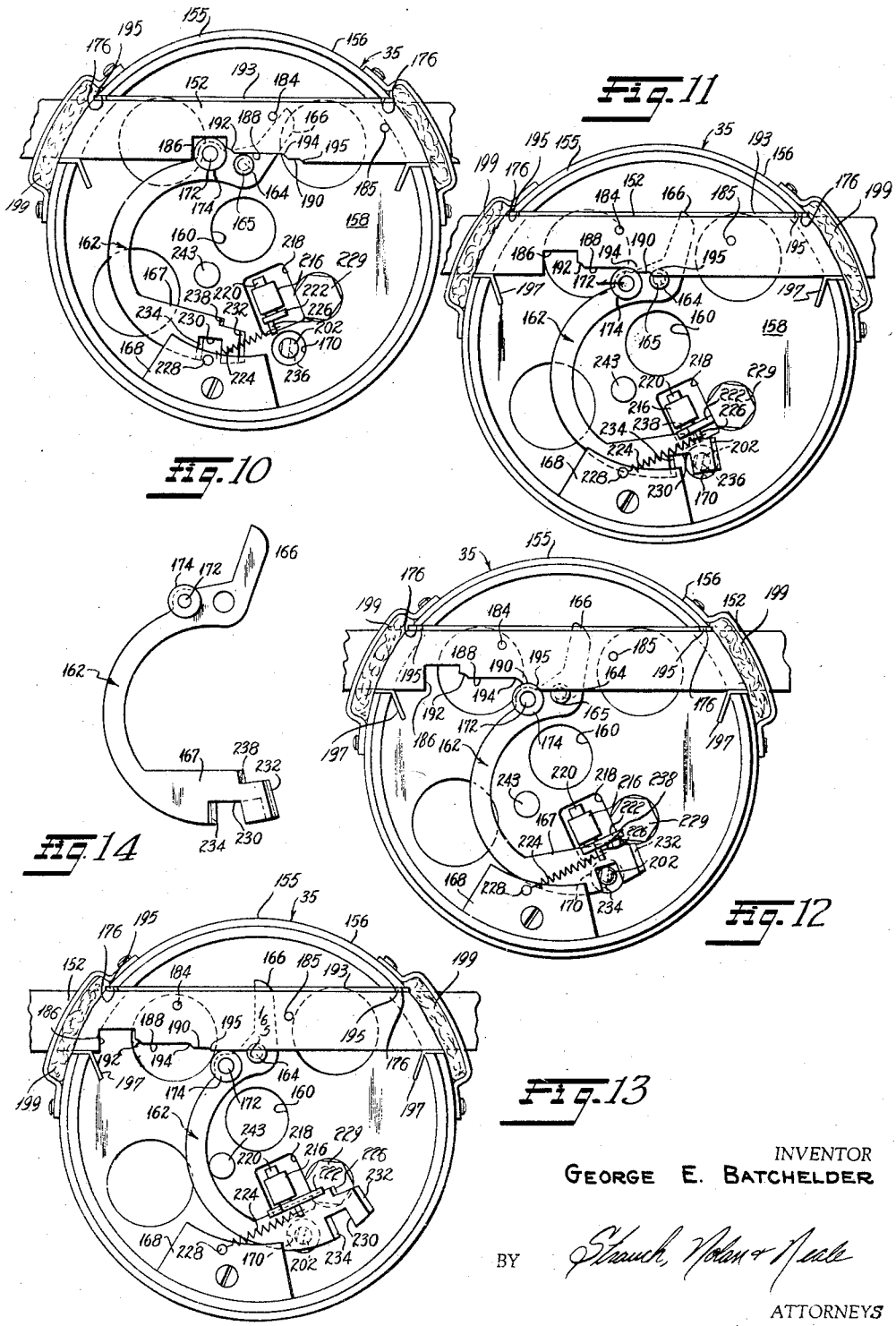

Oct. 7, 1958   G. E. BATCHELDER   2,854,859
LATCH MECHANISM
Original Filed Feb. 17, 1954   4 Sheets-Sheet 4
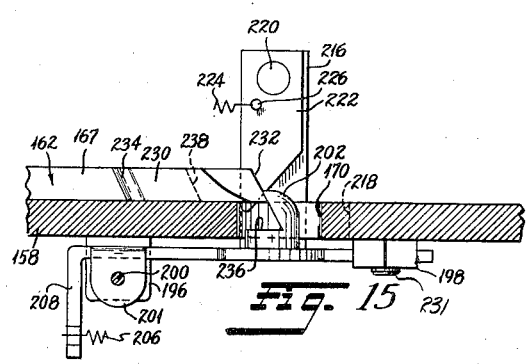
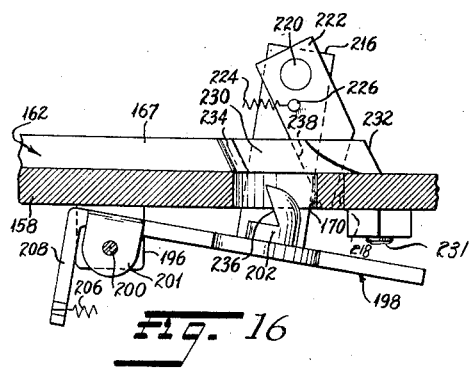
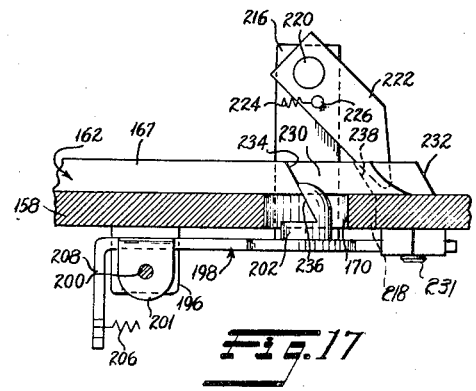
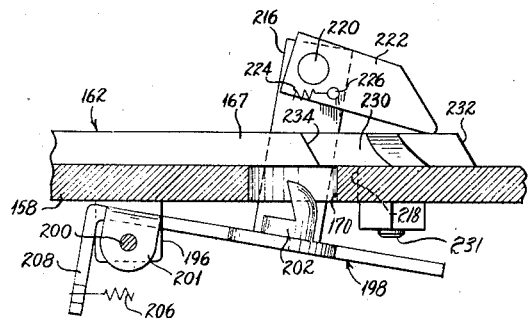
INVENTOR
GEORGE E. BATCHELDER
BY
ATTORNEYS

United States Patent Office 2,854,859
Patented Oct. 7, 1958

2,854,859
LATCH MECHANISM

George E. Batchelder, Pittsburgh, Pa., assignor to Rockwell Manufacturing Company, Pittsburgh, Pa., a corporation of Pennsylvania Original application February 17, 1954, Serial No. 410,975, now Patent No. 2,818,198, dated December 31, 1957. Divided and this application April 30, 1957, Serial No. 656,075

10 Claims. (Cl. 74—527)

This invention relates to a latch mechanism for use with fluid dispensing apparatus and more particularly to improvements in such apparatus for measuring and delivering a predetermined quantity of fluid and for automatically cutting off the delivery of fluid when the desired quantity has been delivered, and is a division of co-pending application Serial No. 410,975 filed February 17, 1954, now Patent No. 2,818,198, issued Dec. 31, 1957.

The invention in its preferred embodiment relates to the dispensing of large quantities of fluid at high velocity through a line having a flow control valve. Should the valve attempt to quickly and completely cut off the flow of fluid in one single stage of closing when the predetermined quantity has been dispensed, the hydraulic hammer caused by this quick cut-off would result in undue shock and damage to the valve, meter and other elements in the fluid line and may break the valve latching mechanism.

Furthermore in such high velocity large quantity fluid flow systems a single valve capable of such quick cut-off would have to be extremely powerful and speedy in action but delicately timed for accurate control, and such a valve and its control and actuating mechanism would be expensive and require constant attention to maintain its accuracy. Various types of single stage closure valve assemblies have been tried for the purpose but they have been mainly inefficient or so complicated or expensive as to prove unacceptable for practical purposes and have been discarded.

Consequently it has been proposed to provide apparatus wherein the delivery of fluid is cut off in gradual stages. For example it has been proposed that a meter in the fluid line operate a preset predetermined register mechanism which through some device such as a latch box will effect staged closing of the line. Usually this is done by closing a main valve when the greater part of the desired quantity of fluid has been delivered and continuing flow at a reduced rate through a smaller valve which is triggered at the proper time to complete the flow cut-off.

This prior two stage plural valve fluid cut-off apparatus has proved to some extent satisfactory in operation but it involves a multiplicity of small complex parts particularly in the latch mechanism for the valve and the valves used in association with such mechanism have been mechanically complex.

It has also been suggested to provide two stage closure of a single valve but such mechanisms have been complex and difficult to maintain in accurate adjustment.

The present latch mechanism invention in a preferred embodiment provides for latching a valve in an open position and for accomplishing plural stage closing of that valve with a relatively simple uncomplicated structure. The number of parts has been reduced and the operation simplified as compared to structures formerly used in such mechanisms.

With these and other considerations in view a major object of this invention is to provide a novel predetermining register latch mechanism for effecting an improved multi-stage closure of a valve.

A further object of the invention resides in an improved plural stage valve latching mechanism.

A still further object resides in providing a novel latch device which includes a member movable between two limit positions and biased to one of the positions with a lever mechanism for latching the movable member in a plurality of positions between the limit positions and a tripping assembly shiftable between two positions and operable upon each successive shift from one of the two positions to the other to unlatch and relatch the latch lever mechanism and permitting an increment of movement of the movable member.

Still another object resides in the provision of a novel latch device in which a trip assembly is shiftable between two positions and coacts with a latching lever to unlatch and relatch a latch bar and the trip mechanism can be successively shifted from one position to another at least three times and for each shifting movement will actuate the latch mechanism to permit a predetermined movement of the latch bar.

With the above and other objects in view, the invention comprises the improved predetermining dispensing mechanism for fluid meters and the construction and relative arrangements of its several component parts, as will hereinafter be more fully described, illustrated in the accompanying drawings, and subsequently incorporated in the appended claims.

Figure 1 is a plan view of a general assembly of the meter, register, valve and control linkage in which the latch mechanism of the present invention is used.

Figure 2 is a front elevation of the assembly shown in Figure 1.

Figure 3 is an enlarged portion of Figure 2, certain parts being broken away to show the drive means from the meter through the latch box to the predetermining register and totalizing register.

Figure 4 is a top plan view of the latch box with the cover plate removed.

Figure 5 is an elevation view of the latch box shown in Figure 4 with a portion thereof cut away and the cover plate attached.

Figure 6 is a bottom view of the latch box shown in Figure 4.

Figures 7, 8 and 9 are top plan, rear elevation and side elevation views respectively of the latch release plate.

Figures 10, 11, 12 and 13 are top plan views of the latch bar, latch lever and release assembly showing their relative positions during the stages of latching and releasing.

Figure 14 is a top plan view of the latch lever.

Figure 15 is a view of a section taken along lines 15—15 of Figure 4 showing details of the latch lever stop means.

Figures 16, 17 and 18 are views similar to Figure 15 showing the latch lever and stop means during the various stages of latch lever escapement.

GENERAL ASSEMBLY

For purposes of illustration, in Figures 1 and 2 of the drawings there is disclosed a preferred general assembly of the several component units of my present invention. The fluid pressure operated meter 30 is preferably of the well known "Rotocycle" type, an example of which is disclosed in United States Patent No. 2,274,206 issued February 24, 1942. The meter is provided with a cast vertical end housing section 31 which encloses a vertically extending continuously driven meter operated drive shaft 32 of Figure 3. Clamped between the upper end of the housing 31 and a base plate 33, as by machine screws passing through spacers 34, is a latch box unit indicated generally by the numeral 35. Rigidly mounted on the base plate 33, as by screws 36, is a housing unit 37 which contains the settable predetermining register mechanism. The totalizing register 38 is secured to the top of housing 37 by suitable means (not shown).

The quantity control valve unit 40 is rigidly attached to the outlet of the fluid meter 30 and is operatively connected to the valve latching unit 35 by a rod 41, arm 43, and shaft 42. Although the illustrated assembly is preferable, the valve unit 40 may alternatively be connected to the inlet side of the meter without exceeding the scope of the invention.

The details of the valve construction are disclosed in aforementioned copending parent application Serial No. 410,975 and disclosed and claimed in copending application Serial No. 663,097 filed on June 3, 1957.

An operating handle 132 and lever arm 43 are removably mounted on the splined outer end of shaft 42. One end of latch rod 41 is pivotally connected to the free end of lever arm 43 as by a clevis and pin arrangement 150. The opposite end of rod 41 is pivoted to a latch bar 152 as by another clevis and pin arrangement indicated at 154 on Figure 1. The shaft 42 is thus connected with the mechanism of latch box 35 by means of lever arm 43, rod 41 and latch bar 152, and reciprocation of latch bar 152 will directly control opening and closing of the valve assembly.

Latch box mechanism

The latch box mechanism is indicated generally by the numeral 35 in Figure 2 and its internal mechanism is best shown in Figures 4–18. The latch box assembly 35 is made up of a base section 155 having a circular side wall 156 and transverse wall 158 which has a central circular opening 160 concentric with side wall 156, which constitutes a casing. Within the base section adjacent to opening 160, a latching lever 162 of planar form is pivotedly mounted at one end on a stud 164 fixed in transverse wall 158. The stud may be headed at 165 to secure the lever 162 against removal. Lever 162 lies and pivots in a plane parallel with and closely adjacent to transverse wall 158 and terminates at its pivoted end in a short angularly disposed arm 166 projecting outwardly from the pivot stud 164 towards the cylindrical body wall 156 for a purpose to be described. The other end of lever 162 is indicated at 167 and is curved to extend from the stud 164 around one side of opening 160. End 167 of the lever is slidably guided by a plate 168 projecting radially inward over said lever from the cylindrical wall and substantially in a diametrical alignment with the pivot stud 164 and fastened by a screw to an integral boss 169 on the transverse wall 158. Adjacent one side of guide plate 168, the transverse wall 158 of the casing is provided with an aperture 170 over which the end 167 of lever 162 partially extends when said lever is in the position shown in Figure 4 of the drawings corresponding to a latched valve open position. Fixed in the lever adjacent the pivot stud 164 and at the opposite side thereof with respect to the lever arm 166 is a stud 172 carrying a latching roller 174 for cooperation with the latch 152 in the manner described below.

The rectangular latch bar 152 is slidably guided in notches or recesses 176 in the cylindrical body wall 156 of the base section for movement in a path substantially normal to the pivot axis of lever 162. Notches 176 are of such a depth as to support the bar 152 above the transverse wall 158 in vertical spaced relationship thereto and bar 152 is retained in said notches by a latch box cover plate 178 (Figure 5) secured to the base section by means of screws 180 threaded into bosses 182 which extend radially inward from the side wall 156. A pin 184 (Figures 4 and 6) extends from the bottom of latch bar 152 and coacts in abutting relation with the short lever arm 166 when bar 152 is moved to the right to rock latch lever 162 in a clockwise direction. A second pin 185 is fixed to bar 152 and disposed within the latch box for limiting its movement to the left, by contacting the short lever arm 166 which is limited by abutment of lever 162 with a pin 242 as will be explained.

In a suitably spaced relation from the pin 184, a notch or recess 186 is formed in the inner face of bar 152. Also formed in the inner face of bar 152, adjacent to notch 186, are camming surfaces 188 and 190, the surface 188 being joined with the recess 186 by means of a bevel surface 192 while the surfaces 188 and 190 are joined together by bevel surface 194. These surfaces and notch 186 are positioned relative to the pin 184 to receive the latch lever roller 174 in an abutting relation as the latch bar 152 moves to the right during valve opening movement. A combined shim and wear plate 193 with end lugs 195 is disposed behind bar 152 in notches 176. The lugs 195 cooperate with the latch box cover 178 to retain the wear plate 193 in position. Small clips 197 are fastened by screws to the edges of notches 176 opposite the wear plate 193 and with plate 193 enable accurate location of latch bar 152 relative to the latch lever roller 174.

Felt wiper assemblies 199 are secured to the outer side of casing wall 156 over each notch 176 and cooperate with the latch bar 152 to prevent foreign matter from entering the casing.

Referring to Figure 6, two integral bosses 196 depend from the bottom of wall 158. Recesses are formed in bosses 196 to receive a rod 200 and portions of bosses 196 are swaged over to retain rod 200. A latch release plate 198 having spaced apertured ears 201 is rockably mounted thereby on rod 200 between bosses 196. Spaced from said rod 200, latch release plate 198 carries an upstanding pin 202 that projects through aperture 170 in the wall 158 of the casing to coact with the end 167 of lever 162, as will presently appear. The plate 198 can be biased toward wall 158 by a spring 206 attached to a lug 208 on the plate 198 opposite the pivot line from pin 202. The other end of the spring is anchored to the casing wall at 210 to normally hold the plate 198 flat against the bottom of wall 158 with the pin 202 projecting through aperture 170 and extending above the upper surface of said wall.

A curved arm 212 on plate 198 extends around one side of the opening 160 in the wall 158 and has spaced lugs 214 on the inner edge projecting inwardly over said opening. It will be evident that the spring 206 constantly urges the pin 202 upwardly into engagement with the end of lever 162, or against its bottom surface, depending on the relative position of lever 162.

As best shown in Figures 4 and 7–13, a rectangular post 216 is also rigidly mounted on the upper side of plate 198 at a point directly above spring 206 and projects through a rectangular aperture 218 in the transverse wall 158. Pivoted to the upper portion of this post by means of a pivot pin 220 is a lock arm 222 which is trapezoidal in shape, the nose section of which extends partially into the opening 218. The nose section of lock arm 222 is normally urged into contact with one side of opening 218 by means of a spring 224 (Figure 4) extending between a pin 226 on arm 222 and pin 228 on guide plate 168.

Referring to Figures 15–18 the pivot pin 220 of lock arm 222 is positioned relative to the end of arm 222 so that the arm 222 may swing and clear the right-hand side wall of opening 218 when plate 198 is abutting the underside of transverse wall 158, however, if plate 198 is depressed against the bias of spring 206, post 216 carrying lock arm 222 will be moved downwardly a slight distance through opening 218 and the swinging movement of arm 222 will then be limited by engagement with the side wall of opening 218. The head 229 of a steel bolt 231 fastened through casing wall 158, can be used to provide a wear-resistant edge abutment for opening 218 and is particularly desirable if the casing 35 is made of relatively soft material. The strength of spring 224 is sufficient, in a normal installation, to act through post 216 to bias latch release plate 198 toward wall 158, and thus the lower spring 206 can be deleted.

Formed on the extreme end of lever 162, Figures 4 and 14, diametrically opposite from the pivot pin 164 is an inclined surface 232 and suitably spaced therefrom along the outer periphery of lever 162 is a recess 230 having a similar inclined surface 234. As shown in Figure 7, the pin 202 has a notch 236 formed to receive the surfaces 232 or 234 when the pin 202 extends above the wall 158. A further inclined surface 238 (Figures 4 and 14) is formed on the inner periphery of the lever arm 162 near the surface 232 but suitably spaced rearwardly therefrom. As the lever 162 is pivoted clockwise about stud 164 by the previously mentioned coaction with latch bar 152, the surfaces 232 and 234 are successively moved past the nose section of the arm 222 allowing the arm 222 to hang down into the aperture 218. Further movement of the bar 152 to the right, Figure 12, will move the inclined surface 232 on the end of lever 162 away from opening 170 and out of contact with pin 202, allowing the spring 206 to urge pin 202 up into the path of the end of lever arm 162. At approximately the same time, the roller 174 on the lever 162 moves over bevelled surface 192 and into recess 186. Spring 206 then acts to rock plate 198 on the rod 204 and positions the notch 236 on pin 202 adjacent the end of lever 162. At this point the valve is in a fully opened position and when the operator releases manual control, the valve spring tends to close the valve and biases latch bar 152 to the left (Figure 4), biasing latch lever 162 counterclockwise to engage the end 232 in the notch 236 of pin 202 thereby securely latching said lever and bar 152 in set position against the action of spring 126 of valve 38. As shown in Figure 4, the surface 232 is bevelled to fit securely into bevelled notch 236 to prevent accidental release.

For the purpose of tripping the pin 202, a tube 240 is loosely disposed through a central opening in a boss 242 integrally formed on the cover 178 as shown in Figure 5. Tube 240 projects through central opening 160 in wall 158 where it is supported upon the lugs 214 of the plate 198. As shown in Figures 1 and 2, the latch box assembly is clamped between the base plate 33 and the upper surface of housing 31 in such a position that the bar 152 is angularly disposed with respect to the axis of the meter for attachment with rod 41 by means of the clevis 154. As viewed in Figure 1, the spring 126 of valve unit 40 will tend to rotate shaft 42 in a counterclockwise direction when the valve has been latched in its open position. Therefore, when the valve has been latched in its open position, the bar 152 is urged in the direction away from the meter in Figure 1 and to the left in Figure 4 and the bevelled surface 192 on bar 152 abuts against roller 174, tending to urge the lever 162 in a counterclockwise direction about its pivot stud 164. Lever 162 is held in the position shown in Figures 4 and 6 by the engagement of the end surface 232 with notch 236.

The latch box mechanism is tripped to allow movement of the bar 152 to the left in Figure 4 (valve closing direction) in the first of three successive stages by depressing the tube 240. Depressing tube 240 will rock plate 198 about the axis of rod 200, Figure 16, thereby disengaging pin 202 from surface 232 on lever 162, allowing lever 162 to pivot counterclockwise about pin 164. When lever 162 is free of restraint, bar 152 will move to the left because of the biasing action of the valve spring, roller 174 will ride up out of engagement with bevelled surface 192 on to surface 188, causing the lever 162 to pivot in a counterclockwise direction until a point has been reached in its pivotal motion, Figures 11 and 16 where the inclined surface 238 contacts the nose portion of lock arm 222, causing it to pivot about pin 220, until the angular surface of the lock arm 222 engages the right-hand wall of opening 218, as viewed in Figure 16. At this point, the lever 162 will be held against further pivotal movement and the bar 152 will have completed its initial stage of closing movement to the left. The roller 172 will now bear against bevel surface 194 and prevent further movement of bar 152. At the end of the first stage of movement of lever 162, recess 230 is positioned directly above opening 170 and pin 202; however, as long as tube 240 is depressed plate 198 is rocked away from the wall 158 and pin 202 cannot extend through recess 230.

The second stage of movement, see Figures 12 and 17, is initiated by releasing tube 240 from its depressed position, thus allowing plate 198 to rock about the shaft 204 moving post 216 and lock arm 222 upwardly in opening 218 until the angular surface of lock arm 222 is disengaged from the right side of opening 218. At the same time, pin 202 is moved upwardly through opening 170 to extend into recess 230 in lever 162. The bevel surface 194 on bar 152 bears against roller 174, urging the surface 238 against the arm 222 and when lock arm 222 is free of engagement with the side of opening 218, it pivots about pin 220 against the pressure of spring 224, allowing further clockwise motion of the lever 162 until surface 234 is engaged in notch 236 of pin 202 as shown in Figure 12. At the same time, roller 174 will have ridden up on to the surface 190 into abutting engagement with bevel surface 195, at which point bar 152 will have completed its second stage of movement to the left.

The third stage of movement of the bar is caused by again depressing tube 240, Figure 18, to rock plate 198 against the pressure of spring 206 to disengage pin 202 from surface 234 on lever 162. Lever 162 is now free to complete its counterclockwise movement about pin 164, as shown in Figure 13, allowing bar 152 to complete its third and last stage of movement to the left, thereby completely closing the main valve and the pilot valve. At this position lever 162 abuts a limit pin 243 in transverse wall 158 to prevent any further unnecessary movement.

As will be understood, the latch release plate 198 carrying pin 202, post 216, and lock arm 222 constitutes an escapement mechanism for biased latch lever 162, actuated by rocking the plate 198 by means of tube 240, and by merely incorporating additional staggered surfaces similar to 232, 234 and 238 on the latch lever 162, additional escapement steps may be realized.

The means by which the latch box mechanism just described is tripped to permit successive three-stage movement of the bar 152 and closing of the valve is within the predetermining register described in aforementioned parent application Serial No. 410,975 and described and claimed in copending application Serial No. 671,365 filed July 11, 1957.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a latch device, a member to be latched, means guidably supporting said member for rectilinear motion, means connected to said member and biasing the member in one direction to an unlatched position, a control mechanism for said member, a shiftable latch release means adapted to coact with said control mechanism, means responsive to movement of said member in a second direction opposite to said one direction to move the latch release means to a first position, means responsive to movement of the latch release means to said first position for latching the control mechanism in a first position, means to move the latch release means to a second position, means responsive to movement of the latch release means to said second position to unlatch, move and relatch the control mechanism to and in a second position whereby said member is moved one step toward unlatched position, means to move the latch release means back to said first position, means responsive to movement of the latch release means back to said first position to unlatch, move and relatch said control mechanism to and in a third position whereby the said member is moved one more step toward unlatched position, means responsive to a second movement of the latch release means towards said second position to unlatch and move said control mechanism to a fourth position whereby said member is moved to said unlatched position.

2. In a latch device, a member to be latched; means guidably supporting said member for rectilinear motion, between two positions, a spring connected to said member biasing the same in one direction to a normal position, a lever pivotally mounted on said supporting means, said lever having an end portion positively engaged by said member in its movement in an opposite direction toward a latched position to rock said lever; said member and lever having coacting means retaining said member in said latched position against the action of said spring; and an escapement mechanism rockably mounted on said supporting means for shifting movement between a first and second position and cooperating with said lever to releasably retain said lever in a latching position and upon successive shifting movements of said escapement means between said two positions to successively reposition said lever step by step to unlatch said member in a plurality of successive stages.

3. In a latch device as defined in claim 2, said escapement means comprises a carrier plate pivotally mounted on said supporting means and having integrally fastened thereto one fixed and one movable escapement lug adapted to alternatively coact with said lever during rocking movement of said escapement means.

4. In a latch device as set forth in claim 3, spring means connected between said carrier plate and the supporting means biasing said supporting means to said first position, and a manually shiftable trip member in bearing contact with said carrier plate operable to displace said carrier plate to said second position.

5. In a latch device, an elongate member to be latched, means guidably supporting said member for reciprocation between two positions, means connected to bias said member in one direction to a normal position, a plurality of detent means on said member in successive staggered relation between the sides of said member and between the ends of said member, a lever pivotally mounted on said supporting means and having an end portion positively engaged by said member in its movement in an opposite direction toward a latched position to rock said lever, means on said lever adapted to coact with one of said detents when said lever is rocked to latched position to retain said member in latched position against the action of said biasing means; and means rockably mounted on said supporting means for shifting movement between a first and second position and cooperating with said lever to releasably retain said lever in a latching position and upon successive shifting movements of said rockable means from one of said positions to the other to permit incremental successive repositioning movements of said lever whereby said means on said lever is successively shifted from each detent to the next succeeding detent, to thereby permit unlatching movement of said member in a plurality of successive stages.

6. In a latch device as defined in claim 5, said means on said lever comprising a roller pivotally carried on said lever and adapted to be moved into a latching relationship with successive ones of said detents depending upon the pivotal position of said pivoted lever.

7. In a latch device as defined in claim 5, said detent means comprising stepped cam surfaces disposed in the side of said member.

8. A latch device comprising: a trippable latch mechanism; a member movable between two positions having a biasing means connected thereto, said member having means cooperating with said latch mechanism which retains said member in one of said positions and several positions intermediate said two positions against the action of said biasing means; a shiftable means movable between two positions and operatively engaging said latch mechanism to cause said latch mechanism to be tripped by movement of said shiftable means from either of said two positions to the other position, said latch mechanism being operable at least twice, when successively tripped by movement of said shiftable means from one of said positions to the other position and back to the first position, to reset itself after each tripping action to hold said member in successive intermediate positions, and operable during a final tripping action to allow said member to move to its other of said two positions.

9. Apparatus as set forth in claim 8 wherein said latch mechanism comprises a latch lever and reciprocable means carried by said shiftable means and having two latching elements adapted to successively alternately engage with and hold said latch lever in at least three positions corresponding to three positions of said member.

10. A latch box device for use in latching a flow control valve, comprising: a casing; means adapted to be connected with the valve and movable between two limit positions in said casing; a first mechanism pivoted in said casing and engaged and moved by said first named means into locking engagement with said first named means when said first named means is moved to one of said limit positions; movably mounted spring biased latching mechanism automatically cooperating with said first mechanism to latch said first mechanism and hold said first named means in said one limit position; second means constituting an operator member shiftable between two positions and operable when shifted to one position to engage and move said latching mechanism to a second position whereby said first mechanism may be repositioned to release engagement with said first named means and reengage and hold said first named means at an intermediate position between said limit positions; said second means being operable, when shifted back to its other position from said one position, to release and enable return of said latch mechanism to its initial position thereby allowing said first mechanism to again reposition, release engagement with, and reengage and hold said first named means at a second intermediate position between said limit positions; and said second means being again operable upon a further shift to said one position, to move said latch mechanism to said second position to release and enable disengagement of said first mechanism with said first named means to enable said first named means to move to the other limit position.

No references cited.